United States Patent [19]
Nakanishi

[11] Patent Number: 5,759,100
[45] Date of Patent: Jun. 2, 1998

[54] GAME MACHINE CONTROLLER

[75] Inventor: Yutaka Nakanishi, Tokyo, Japan

[73] Assignee: Optec Co., Ltd., Tokyo, Japan

[21] Appl. No.: 699,442

[22] Filed: Aug. 19, 1996

[30] Foreign Application Priority Data

Aug. 25, 1995 [JP] Japan .................. 7-217418

[51] Int. Cl.$^6$ ........................... A63F 9/22
[52] U.S. Cl. ............... 463/37; 273/148 B; 463/44
[58] Field of Search ................... 463/36, 37, 38, 463/39, 44; 273/148 B; 345/157, 162; 341/21, 22; 340/825.15, 825.19

[56] References Cited

U.S. PATENT DOCUMENTS

| | | | |
|---|---|---|---|
| 5,259,626 | 11/1993 | Ho | 463/37 |
| 5,317,505 | 5/1994 | Karabed et al. | 463/37 |
| 5,451,053 | 9/1995 | Garrido | 463/37 |
| 5,551,701 | 9/1996 | Bouton et al. | 463/36 |

*Primary Examiner*—Jessica Harrison
*Assistant Examiner*—Michael O'Neill
*Attorney, Agent, or Firm*—Sixbey, Friedman, Leedom & Ferguson; David S. Safran

[57] ABSTRACT

A game machine controller according to the present invention is provided with a memory pack equipped with a nonvolatile memory. The memory pack is able to store a plurality of commands designated by a predetermined button operation as command programs. Once the data is stored, it is retained unless it is compulsorily rewritten or deleted. The command program stored in the memory pack is retrieved and executed by a simple operation of the command buttons. The memory pack can be attached and detached freely so that it can conform to each software. As a result, once the command programs are stored, there is no need to renew the command programs every time the game software is replaced.

7 Claims, 2 Drawing Sheets

5,759,100

GAME MACHINE CONTROLLER

BACKGROUND OF THE INVENTION

1. Field of the Invention

The present invention relates to a game machine controller, and more particularly to a game machine controller which controls a game by transmitting a button operation signal to a game machine body.

2. Description of the Related Art

As game machines have improved, so has software. Therefore, the game machine controller requires advanced operational skill. For example, in the case of a combat game, several operation buttons must be operated in a predetermined operational procedure in addition to operational timing, so that a particular technique can be performed. In order to adopt a variety of techniques, the user must memorize the operational procedure, etc., and have an advanced skill for regularly reproducing the timing of the button operation. Therefore, there is a problem in that the beginner cannot enjoy the game very much, because he or she cannot perform the desired technique.

In order to solve the above-mentioned problem, a command program, which represents a command composed of the operational procedure and the operational time of the operation buttons, is previously stored in an internal memory of a controller body. The command program is retrieved according to a simple button operation while the game is being played. There is proposed a controller which transmits the command in accordance with the command program to the game machine body.

However, the number of stored command programs is limited by a storage capacity of the internal memory in the controller body. As a result, for example, there is a problem in that the command programs must be renewed for every game software. There is another problem in that only the small number of commands are used while the game is being played, because the number of the command buttons provided in the controller body for an operation to retrieve the command programs is limited.

SUMMARY OF THE INVENTION

The present invention has been developed in view of the above-described circumstances, and has its object the provision of a game machine controller which expands a memory capacity for storing command programs which execute commands, and which does not require the command programs to be renewed for every game software.

In order to achieve the above-mentioned object, a game machine controller connected to a game machine body for operating a software program executed by the game machine comprises: operation buttons conforming to a standard of the game machine; one or more of command buttons for an operation to execute commands; a memory pack provided in a body of the game machine controller in such a manner to be attached and detached freely and equipped with a nonvolatile memory storing a plurality of command programs for executing a plurality of commands; a command program storage means for storing a desired command program in the nonvolatile memory in the memory pack according to an operation of the operation buttons during a mode of preparing command programs; and a command program execution means for retrieving a desired command program stored in the nonvolatile memory in the memory pack according to an operation of the command buttons and transmitting a command in accordance with the command program to the game machine body.

According to the present invention, the game machine controller of the present invention comprises: the operation buttons conforming to the standard of the game machine; the command buttons for the operation to execute the commands; and the memory pack provided in the body of the game machine controller in such a manner to be attached and detached freely and equipped with the nonvolatile memory storing a plurality of command programs for executing a plurality of commands.

A desired command program is stored in the nonvolatile memory in the memory pack according to a operation of the operation buttons by the command program storage means. The command program execution means retrieves a desired command program stored in the nonvolatile memory in the memory pack according to a operation of the command buttons, and transmits the command in accordance with the retrieved command program to the game machine body.

As a result, the command produced by the complicated button operations can be executed according to the simple button operations. Because the memory pack is adopted according to the type of the game software, there is no need to renew the command programs every time the game software used in the game machine is replaced, once the command programs are stored. The memory capacity is not limited in this case.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Figure 1:
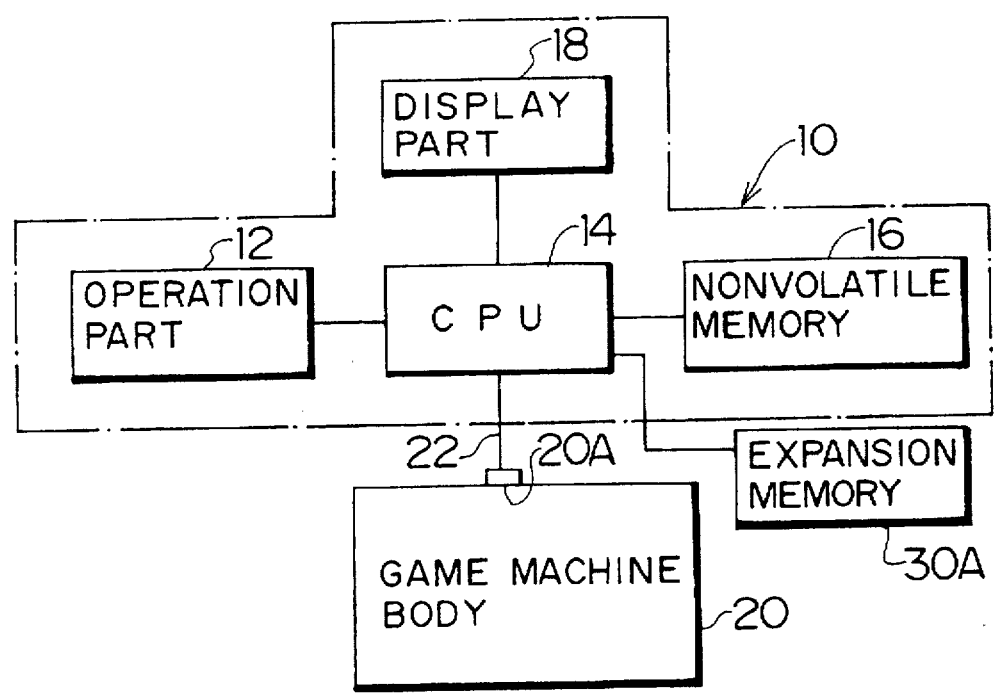
FIG. 1 is a view illustrating the structure of a game machine controller according to the present invention and a game machine body connected to the controller.
Figure 2:
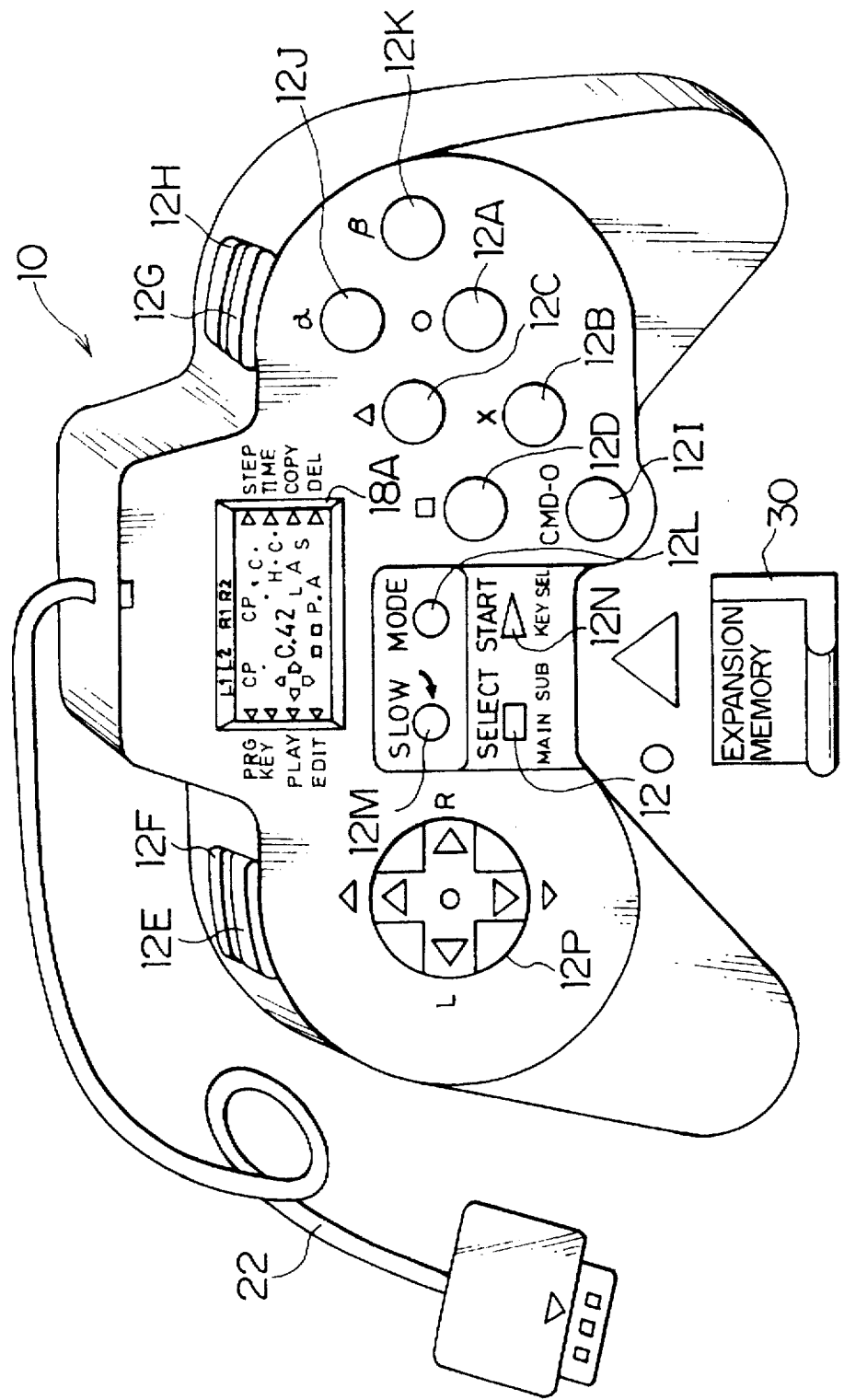
FIG. 2 is a perspective view illustrating an appearance of the game machine controller according to the present invention.

FIG. 1 is a view illustrating the structure of a game machine controller according to the present invention and a game machine body connected to the controller. FIG. 2 is a perspective view illustrating an appearance of the game machine controller according to the present invention.

As shown in FIG. 1, the controller 10 is connected to a controller connecting terminal 20A via a connector 22.

As shown in FIG. 1, the controller 10 comprises an operation part 12, a central processing unit (CPU) 14, a nonvolatile memory 16, and a display part 18.

As shown in FIG. 2, the operation part 12 consists of buttons "O" 12A, "X" 12B, "△" 12C, "□" 12D, "L1" 12E, "L2" 12F, "R1" 12G, and "R2" 12H, command buttons "CMD-0" 12I, "α" 12J, and "β" 12K, a "MODE" button 12L, a "SLOW" button 12M, a "START" button 12N, a "SELECT" button 12O, and a direction key (L, R, △, ▽) 12P. Incidentally, operations of these buttons will be explained later.

The nonvolatile memory 16 is, for example, an EEPROM, and retains the stored data even if the power is turned off. The nonvolatile memory 16 is able to store, for example, up to 63 commands if a sequence of button operations (command program) is one command. A number, which is designated on each command program, is determined by a simple button operation, so that the command program can be retrieved from the nonvolatile memory 16 to the CPU 14. The signal of the sequence of the button operations in accordance with the command program is transmitted to the game machine body 20.

Incidentally, the controller 10 is provided with a mounting part for mounting a memory pack 30 which is equipped with an expansion memory 30A (which is nonvolatile like the nonvolatile memory 16). If the memory pack 30 is inserted into an outlet of the mounting part, the memory capacity for storing the command programs can be expanded. For example, the expansion memory 30A is able to store 63 commands. If the memory pack 30 is attached to the controller 10, the controller 10 can store 63+63=126 commands. The controller 10 is provided with a switch for detecting that the memory pack 30 is attached to the controller 10. When the CPU 14 detects that the memory pack 30 is attached, it increases the number of command programs, which may be stored, by a capacity of the expansion memory 30A of the memory pack 30. If the commands for use are stored in the memory pack 30 conforming to each software, and the memory pack 30 is attached to the controller 10 when the software is used, there is no need to store the commands over again according to the software, unlike the conventional controller.

As shown in FIG. 2, the display part 18 displays each setting on a liquid crystal display panel (LCDP) 18A.

The CPU 14 receives the button operation signal from the operation part 12, and controls the above-mentioned blocks according to the signal. Then, the CPU 14 transmits each control signal to the game machine body 20.

Next, a detailed explanation will be given about an example in which the controller 10 is used.

The controller 10 stores a sequence of the button operations in the nonvolatile memory (nonvolatile memory 16 or expansion memory 30A) which is built therein or attached thereto. The controller 10 retrieves the sequence of the button operations from the nonvolatile memory 16 or the expansion memory 30A and executes it according to a simple operation while the game is being played. In an "edit program mode", the user can prepare the sequence of the button operations for storing. Furthermore, the detailed adjustment can be done easily with the plain graphics on the LCDP 18A by an editing function. A long-step program can be made by an automatic connecting function. As a result, a high technique can be realized.

First, an explanation will be given about how to store a sequence of the button operations (storage of the command programs). Incidentally, the storage is performed in the nonvolatile memory 16, which is built in the controller 10, in the following explanation. The storage is also performed in the expansion memory 30A in the same manner.

When a sequence of the button operations is stored in the nonvolatile memory 16, the storage is performed in the above-mentioned "edit program mode". If this mode is selected, the "SELECT" button 12O is pressed several times while the "MODE" button 12L is being pressed. The mode is switched from "play mode" to "edit program mode" to "button setting mode" by the button operation. A cursor at the left-hand side of the LCDP 18A is moved from "PLAY" to "EDIT" to "KEY", which are printed by the left-hand side of the LCDP 18A.

If the "edit program mode" is designated, a command number and a command button are displayed on the LCDP 18A and the cursor at the left-hand side of the LCDP 18A is displayed at "EDIT". The command number indicates a number of the stored sequence of the button operations (command program). The command button indicates a command button which is used when the sequence of the button operations is reproduced.

For instance, there are command numbers from 1 to 21, and three types of command buttons "$C_0$", "$C_1$", and "$C_2$" are allotted to each command number. Therefore, 21×3=63 command programs can be stored. Incidentally, "E" is displayed at the head of the command numbers of the expansion memory 30A in the memory pack 30, and there are the command numbers from E01 to E21.

In order to store the command program at a desired number, "↑" or "↓" of the direction key 12P is pressed, so that the number can be increased or decreased to the desired number. Incidentally, when the command number is increased from 1 to 21 if the memory pack 30 is attached, the command numbers of the memory pack 30 are displayed from E01 to E21 sequentially.

All the displayed command buttons are effective whether they have already been used or have not been used yet. When one command button is pressed, the display of the other command buttons disappears. Then, a cursor at the right-hand side of the LCDP 18A is displayed at "STEP", and the "edit program mode" starts.

Next, the "SELECT" button 12O is pressed, and the cursor at the right-hand side of the LCDP 18A is moved to "STEP", "TIME", "COPY", or "DEL", which are printed by the right-hand side of the LCDP 18A, so that the editing can be started. Incidentally, every time the "SELECT" button 12O is pressed, the cursor at the right-hand side of the LCDP 18A moves from "STEP" to "TIME" to "COPY" to "DEL" to "STEP".

The numbers displayed on the LCDP 18A indicate: a step number in the case of "STEP"; a time from 0.00 to 4.27 at intervals of 0.01 second in the case of "TIME"; a command number in the edit program mode in the case of "COPY"; and a command number in the case of "DEL".

In order to prepare the command program in the edit program mode, the unused command button is selected, and then the button operation is entered from the step number 1 afterwards. If a button (buttons) to be entered is pressed, the pressed button is displayed. If the pressing is correct, the "SLOW" button 12M (which also servers as an ENTER button) is pressed. As a result, a command, which is represents a pressing the button for 4/60 second, is stored. The storage is displayed for one second, and then the next step is displayed automatically (only in the case of the command having been not stored.)

The button operations are stored sequentially as described above. Incidentally, some software require a blank time between a button operation and the next button operation. In this case, only the "SLOW" button 12 is pressed, a blank time of 4/60 second is stored.

Incidentally, when the data relating to the operation buttons at each step of the command program, which is being entered or has been stored, is changed or added, the cursor at the right-hand side of the LCDP 18A is moved to "STEP", and the following operations are performed.

If "↑" is pressed while the "MODE" button 12L is being pressed, the step number increases. If "↓" is pressed while the "MODE" button 12L is being pressed, the step number decreases. Since the stored operation button at each step is displayed, what is stored can be seen. In order to change the storage of the operation button, the displayed button is performed the storage operation again, so that the storage of the button can be deleted (When a button A is stored, the storage of the button A is deleted if the button A and the "SLOW" button are pressed.) Likewise, if a button which has been not stored is stored here, the storage of the button can be added. Even if all the storage of the buttons are deleted, the date relating to the time is retained, so the step is blank.

When a new-step button operation is inserted into the command program, the "SLOW" button 12M is pressed while the "MODE" button 12L is being pressed. As a result, a step which has been not stored is inserted into the command program at the step number, which has been displayed. The previous steps are moved back, and each step number is increased by 1.

When each step of the command program, which is being entered or has already been stored, is deleted, or the execution time of which is changed, the cursor at the right-hand side of the LCDP 18A is moved to "TIME". Then, the following operations are performed.

In order to increase or decrease the execution time of every step of the command program, which is being entered or fixed in some cases due to the instability of a pad signal input in the software, "↑" is pressed simultaneously with the pressing of the "MODE" button 12, so that ⅔₀ second is added for all steps. Likewise, if "↓" is pressed, ⅔₀ second is extracted. In both cases, the maximum time is 4.27 seconds, and the minimum time is 0.03 second. The operational time can be increased or decreased for the whole command, so it is convenient for the beginner. Because the operational time for the whole command is changed, "ALL" is displayed at a position of the number, and then the new time is displayed.

In order to increase or decrease the execution time of the step, the time increases ⅟₆₀ second if "↑" is pressed. The time decreases ⅟₆₀ second if "↓" is pressed. When the time exceeds 4.27 seconds, a step is automatically added. The time cannot exceed 8.53 seconds. If the time is decreased to 0 and then one second passes, the step is deleted. The step is deleted in this manner.

When the command program, which is being entered or has already been stored, is copied, "↑" or "↓" of the direction key 12P is pressed simultaneously the pressing of the "MODE" button 12L so as to call the command number, at which the command program to be copied is stored. Then, the cursor at the right-hand side of the LCDP 18A is moved to "COPY". The command button, at which the command program to be copied is stored, is pressed simultaneously with the pressing of the "SLOW" button 12M, so that "command copy mode" can be set.

In the "command copy mode", when "↑" or "↓" is pressed, and the command number to which the command program is copied is selected, whether the command button of the displayed "command number" is used or not is displayed (the stored command button is lighted, and the command program having not been stored is blinking.) The command button (having not been stored), in which the copied command is to be stored, is pressed to designate the destination. When the "MODE" button 12L and the "SLOW" button 12M are pressed, the command is directly copied to the designated destination.

If the command is to be copied in a state of being converted crosswise, "MODE" button 12L and the "SLOW" button 12M are pressed simultaneously with the pressing of "→" or "←". As a result, the crosswise direction of the direction key of the stored command is inverted.

When the command program, which is being entered or has already been stored, is deleted, the cursor at the right-hand side of the LCDP 18A is moved to "DEL", and then the following operations are performed.

If the cursor at the right-hand side of the LCDP 18A is moved to "DEL", and the "SLOW" button 12M is pressed, the frame number is displayed as "DEL", which is blinking with all the stored command buttons for warning of the deletion mode. If the mode enters the deletion mode by mistake, the "MODE" button 12L is pressed three times, so that the mode can return to the play mode. If the "SLOW" button 12M is pressed while the "MODE" button 12L is being pressed, all the programs of the command number are deleted, and the command number after deletion is displayed.

When the cursor at the right-hand side of the LCDP 18A is moved to "DEL", and the "SLOW" button 12M is pressed while the command button to be deleted is being pressed, the command number is displayed as "DEL", which is blinking with the command button to be deleted for warning of the deletion mode. If the mode enters the deletion mode by mistake, the "MODE" button 12L is pressed three times, so that the mode can return to the play mode. If the "SLOW" button 12M is pressed while the "MODE" button 12L is being pressed, all the programs of the blinking command button are deleted.

If the blinking command number is pressed, the storage is completed and the mode returns to the play mode.

Incidentally, when the "SELECT" button 12O is pressed several times while the "MODE" button 12L is being pressed and the "button setting mode" is selected, the cursor at the left-hand side of the LCDP 18A is displayed at "KEY" and the numbers from 0 to 4 are displayed on the LCDP 18A.

The function of the controller's each button is allocated to each number. The number of a desired button setting is designated by "↑" and "↓" of the direction key 12P, so that the button setting can be as desired.

Next, an explanation will be given about how to execute the commands, which are stored in the nonvolatile memory 16 or the expansion memory 30A in the above-mentioned manner.

The command is executed in a single mode or a double mode. When the power is tuned on, the single mode is selected as an initial mode, and the button arrangement is standard. A letter S is displayed at the lower right-hand side of the LCDP 18A.

In the single mode, only if the command button is pressed, the command number of which is displayed on the LCDP 18A can be executed. The command number is selected by pressing "↑" or "↓" of the direction key 12P while the "MODE" button 12L is being pressed.

If the "START" button 12N is pressed while the "MODE" button 12L is being pressed, the buttons are arranged in a specified button arrangement of the single mode. The specified button arrangement is set by the key setting mode to be called.

If the "START" button 12N is pressed again while the "MODE" button 12L is being pressed, the buttons are arranged in the standard arrangement of the double mode. If the "START" button 12N is pressed once more, the buttons are arranged in the specified arrangement of the double mode, and a letter W representing the double mode, is displayed at the lower right-hand side of the LCDP 18A. The letter S is not displayed in this case.

In the double mode, many commands can be executed by two button operations. The buttons "O" 12A, "X" 12B, "Δ" 12C, "□" 12D, "L2" 12F, and "R2" 12H are pressed within one second after the command buttons "C0", "C1", and "C2" are pressed. As a result, 18 commands can be executed at one time. The "SELECT" button 12O is pressed to change the main mode to the sub mode, so that 36 commands can be executed without the switching of the command numbers.

Incidentally, every time the "SELECT" button 12O is pressed, the main mode and the sub mode are switched back and forth. In the main mode, the displayed number is a command number in the main command, and in the sub mode, the small characters "sub" is displayed beside the number. The command number in the sub mode, which is displayed on the LCDP 18A, is displayed as a number, which is found by adding 1 to the command number in the main mode, in the single mode. A number, which is found by adding 6 to the command number, is displayed in the double mode. As a result, 6 commands can be executed in the single mode, and 36 commands in the double mode.

There are three command buttons for an operation to execute the stored commands. "C0" is at a fixed position (CMD-0 button 121). If the button setting is changed, "C1" and "C2" can move to "L1" 12E, "L2" 12F, "R1" 12G, and "R2" 12H (in the normal button setting, "C1" is set at an "α" button 12J, and "C2" is set at a "β" button 12K.)

If "Cn" is pressed as an option of the command execution while the "MODE" button 12L is being pressed, the normal setting is changed to the manual repeat setting by the first pressing, and the automatic repeat setting by the second pressing, and the normal setting by the third pressing.

If the command button of the normal setting is pressed during the single mode, the signal of the button operation is automatically transmitted to the game machine body 20 in accordance with the command program. In this case, every time the command button is pressed, only one command is executed. Incidentally, the button operations are not accepted while the program is being executed.

While the command button of the manual repeat setting is being pressed, the command is executed repeatedly. If the command button is released, the execution of the command is terminated.

Every time the command button of the automatic repeat setting is pressed, the automatic repeating execution and the automatic repeating cancel are switched back and forth. While the automatic repeating is performed, there is no need to keep on pressing the command button. The command is executed repeatedly. If the command button is pressed one more time while the command is being executed, the command execution is terminated.

Incidentally, in this embodiment, the main mode and the sub mode are switched back and forth so that two commands can be executed by one command button. However, the sub mode is not always required.

As has been described above, according to the game machine controller of the present invention, the memory pack equipped with the nonvolatile memory is provided in the body of the game machine controller in such a manner to be attached and detached freely, and the command programs for executing desired commands are stored in the nonvolatile memory. As a result, the storage capacity of the useable nonvolatile memory is not limited. The memory pack is adopted according to the type of the game software, so that the command programs does not have to be renewed every time the game software is replaced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A game machine controller connected to a game machine body for operating a software program executed by said game machine, comprising:

operation buttons conforming to a standard of said game machine;

one or more of command buttons for an operation to execute commands;

a memory pack provided in a body of said game machine controller in such a manner to be attached and detached freely and equipped with a nonvolatile memory storing a plurality of command programs for executing a plurality of commands;

command program storage means for storing a desired command program in said nonvolatile memory in said memory pack according to an operation of said operation buttons during a mode of preparing command programs; and command program execution means for retrieving a desired command program stored in said nonvolatile memory in said memory pack according to an operation of said command buttons and transmitting a command in accordance with said command program to said game machine body.

2. The game machine controller according to claim 1, comprising:

a main/sub switching button for an operation to select main or sub command program and a number of said command buttons;

wherein said command program execution means retrieves one command program from a number of command programs which is twice the number of said command buttons according to an operation of said main/sub switching button and said number of command buttons.

3. The game machine controller according to claim 1, further comprising:

a number of first buttons and a number of second buttons consisting of said operation buttons and said command buttons, and command execution mode selection means for selecting a single mode or a double mode; and wherein said command program execution means retrieves one command program from a number of command programs equal to said number of first buttons according to an operation of said first buttons when said command execution mode selection means selects said single mode, and retrieves one command program from a number of command programs equal to said number of first buttons multiplied by said number of second buttons according to a combined operation of said first buttons and said second buttons when said command execution mode selection means selects said double mode.

4. The game machine controller according to claim 1, further comprising:

a main/sub switching button for an operation to select a main or sub command program, a number of first buttons and a number of second buttons consisting of said operation buttons and said command buttons, and command execution mode selection means for selecting a single mode or a double mode; and wherein said command program execution means retrieves one command program from a number of command programs equal to twice the number of first buttons according to an operation of said main/sub switching button and said first buttons when said command execution mode selection means selects said single mode, and retrieves one command program from a number of command programs equal to the number of first buttons multiplied by the number of second buttons according to a combined operation of said main/sub switching button, said first buttons and said second buttons when said command execution mode selection means selects said double mode.

5. A game machine controller connected to a game machine body for operating a software program executed by said game machine, comprising:

operation buttons conforming to a standard of said game machine;

one or more of command buttons for an operation to execute commands executed in a predetermined operational procedure of said operation buttons;

a nonvolatile memory storing a plurality of command programs for executing a plurality of commands;

command program storage means for storing a desired command program in said nonvolatile memory according to an operation of said operation buttons during a mode of preparing command programs;

operational time setting means for setting an operational time of said each operation button of said command program; and command program execution means for retrieving a desired command program stored in said nonvolatile memory according to an operation of said command buttons and transmitting a command in accordance with said command program to said game machine body.

6. A game machine controller connected to a game machine body for operating a software program executed by said game machine, comprising:

operation buttons conforming to a standard of said game machine;

one or more of command buttons for an operation to execute commands executed in a predetermined operational procedure of said operation buttons;

a nonvolatile memory built in a body of said game machine controller and storing a plurality of command programs for executing a plurality of commands;

a memory pack provided in the body of said game machine controller in such a manner to be attached and detached freely and equipped with a nonvolatile memory storing a plurality of command programs for executing a plurality of commands;

command program storage means for storing a desired command program in said nonvolatile memory built in the body of said game machine controller, or said nonvolatile memory in said memory pack according to an operation of said operation buttons during a mode of preparing command programs;

copying means for copying a desired command program from said nonvolatile memory built in the body of said game machine controller to said nonvolatile memory in said memory pack, or from said nonvolatile memory in said memory pack to said nonvolatile memory built in the body of said game machine controller; and command program execution means for retrieving a desired command program stored in said nonvolatile memory built in the body of said game machine controller or said nonvolatile memory in said memory pack according to an operation of said command buttons and transmitting a command in accordance with said command program to said game machine body.

7. The game machine controller according to claim 6, wherein said copying means inverts a crosswise direction of a direction key of a command program according to a prescribed command operation so as to copy said command program.

* * * * *